April 13, 1926.
H. H. OSBORN
1,580,320
HIGH POTENTIAL APPARATUS
Filed May 29, 1920
4 Sheets-Sheet 1
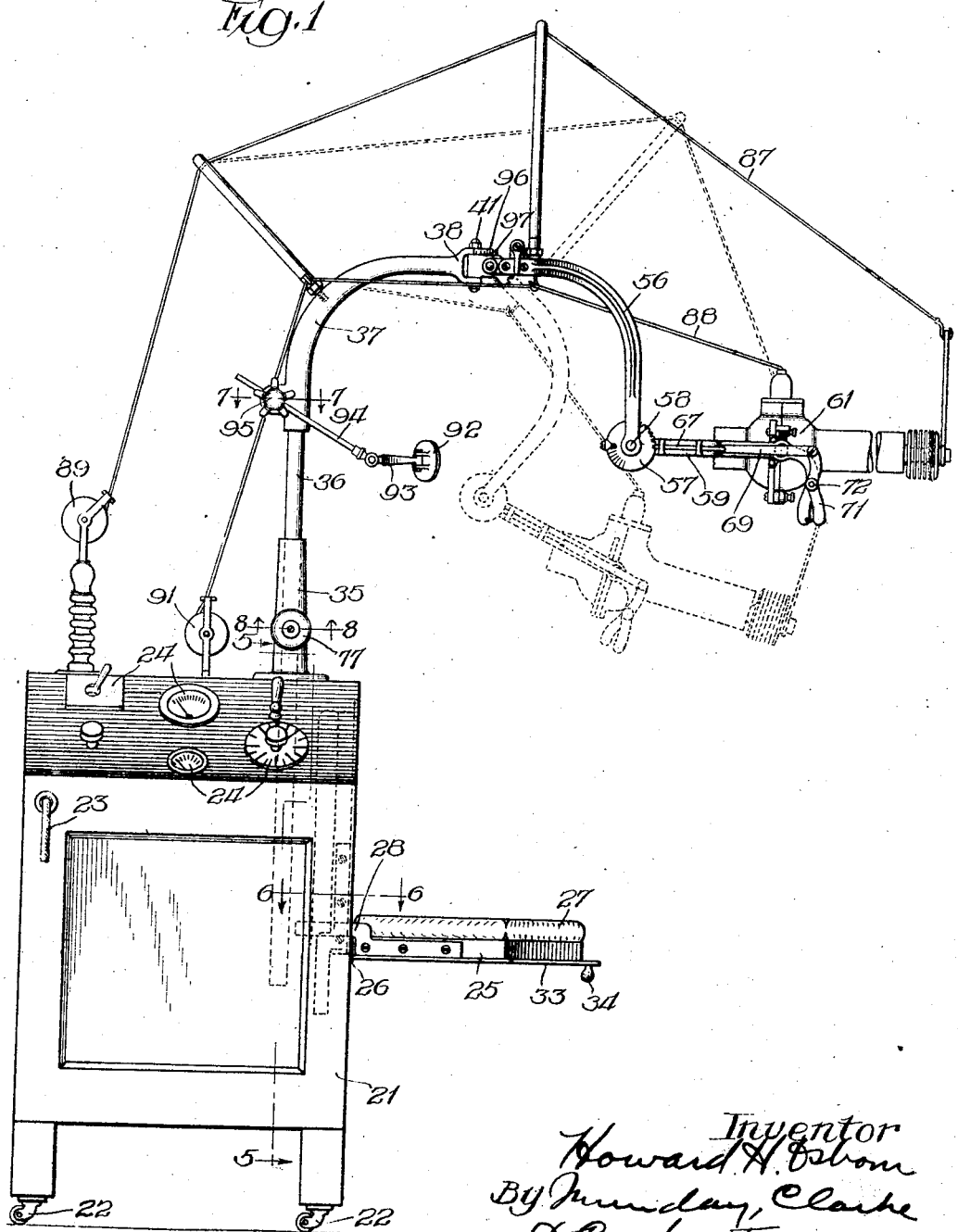

April 13, 1926.
H. H. OSBORN
1,580,320
HIGH POTENTIAL APPARATUS
Filed May 29, 1920
4 Sheets-Sheet 2
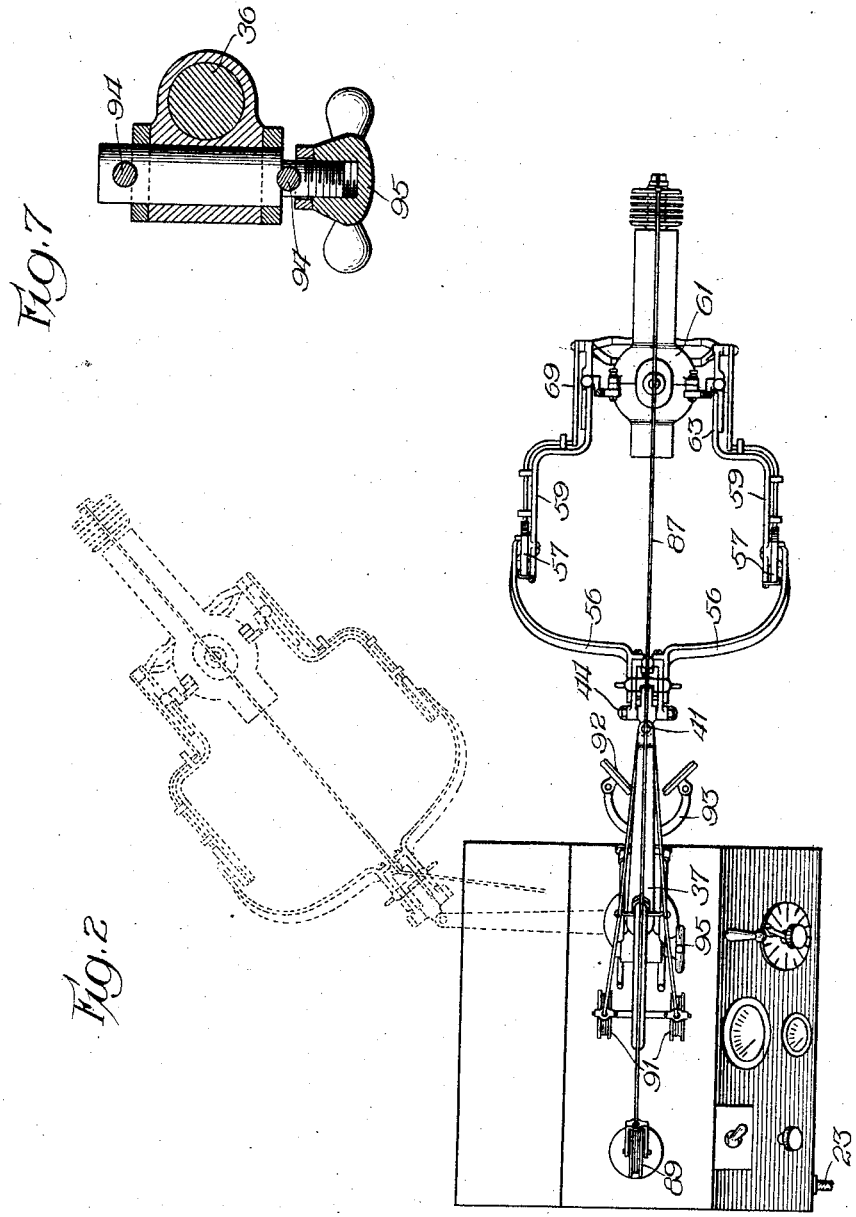
Inventor
Howard H. Osborn
By Munday, Clarke
Carpenter Atty's.

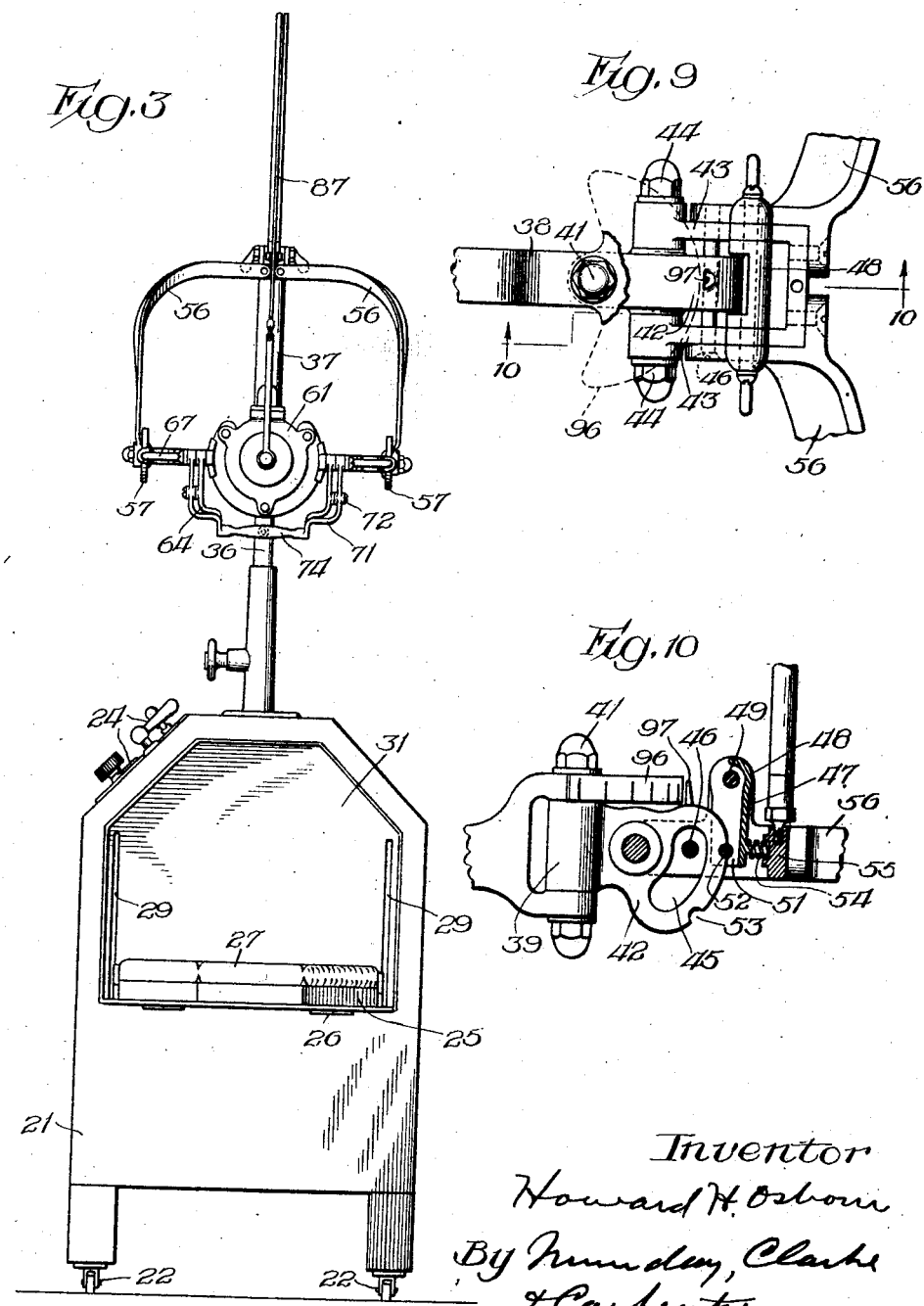

April 13, 1926.
H. H. OSBORN
1,580,320
HIGH POTENTIAL APPARATUS
Filed May 29, 1920
4 Sheets-Sheet 4
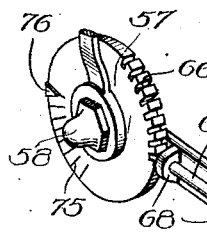

Patented Apr. 13, 1926.

1,580,320

UNITED STATES PATENT OFFICE.

HOWARD H. OSBORN, OF CHICAGO, ILLINOIS, ASSIGNOR TO H. G. FISCHER & CO., OF CHICAGO, ILLINOIS, A CORPORATION OF ILLINOIS.

HIGH-POTENTIAL APPARATUS.

Application filed May 29, 1920. Serial No. 385,355.

*To all whom it may concern:*

Be it known that I, HOWARD H. OSBORN, a citizen of the United States, residing in Chicago, in the county of Cook and State of Illinois, have invented a new and useful Improvement in High-Potential Apparatus, of which the following is a specification.

This invention relates in general to high potential apparatus and while it is hereinafter described in connection with an apparatus provided for the taking of X-ray dental photographs, it will be readily manifest as the invention is better understood that it is capable of embodiment in apparatus of other character and for other purposes.

A principal object of the present invention is the provision of an apparatus of simple construction, which will be entirely complete for its intended purpose and which will be capable of extremely accurate operation.

A further important object of the invention is the provision of an apparatus for the taking of dental X-ray photographs, whereein the construction of the various parts will facilitate and insure the maintenance of accurate X-ray photographic relations between the tube and the plates within the mouth of the patient.

Another and highly important object of the invention is the provision of a construction of the character described, which will permit of the duplicating of the conditions prevailing at the time of the taking of a particular photograph in a subsequent exposure.

Another important object of the invention is the provision of an apparatus which will be easily operable and controlled and which may be moved into and out of photographing position and which will be without complicated mechanical parts likely to require frequent repair or replacement.

Numerous other objects and advantages of the invention will be apparent as it is better understood from the following description, which taken in connection with the accompanying drawings discloses a preferred embodiment thereof.

Referring to the drawings,

Figure 1 is a side elevation of an apparatus embodying my invention;

Fig. 2 is a top plan view thereof;

Fig. 3 is a front view thereof;

Fig. 4 is a perspective view of the tube carrier;

Fig. 5 is a section taken substantially on the line 5—5 of Fig. 1;

Fig. 6 is a section taken substantially on the line 6—6 of Fig. 1;

Fig. 7 is a section taken substantially on the line 7—7 of Fig. 1;

Fig. 8 is a section taken substantially on the line 8—8 of Fig. 1;

Fig. 9 is an enlarged partial top plan view of the connection between the tube supporting arm and the yoke; and Fig. 10 is a section taken substantially on the line 10—10 of Fig. 9.

For the purpose of illustrating my present invention I have shown on the drawings a cabinet generally indicated at 21 and preferably supported upon castors 22 so that it may be moved about as conditions may require. This cabinet contains transformers and other parts for producing the high potential or X-ray circuit and is provided with wiring 23 for the attachment into appropriate house lighting circuits. The cabinet also contains various controls and indicators 24. My present invention does not relate to the specific details of construction of any of these devices and they are only of interest since they are mounted within the cabinet and they may be of any usual or preferred form or construction.

On the front of the cabinet I provide a support for the patient; in the present instance this support is a seat 25 hinged at 26 to the front of the cabinet and having a cushion 27 upon which the patient sits. The seat is provided with rearwardly extending arms 28 taking through slots 29 in an inset wall 31 at the casing front, these arms engaging internally provided stops 32 (Fig.

5) for holding the seat in horizontal position. The seat is adapted to close into the apparatus and is provided with a bottom wall 33 having a knob 34 which bottom wall forms the front wall of the cabinet when the seat is lifted into closed position.

A hollow bearing boss 35 extends up from the top of the cabinet and through this boss extends a rod 36 having at its upper end an upwardly and outwardly curved arm 37 which supports the X-ray apparatus. The upper end of this arm is bifurcated as indicated at 38 to receive a coupling 39 held in vertical position by a pivot pin or bolt 41 permitting horizontal swinging of the X-ray tube. The coupling has an outwardly extending wing 42 embraced by spaced arms 43 of a head yoke, which head yoke will be presently described. These arms 43 are pivoted on a horizontal axis by bolt 44 extending through them and through the wing 42. This wing is provided with a curved aperture or opening 45 through which extends a screw 46 provided in the arm 43, which arm is provided with an upstanding boss or shoulder 47 in which is pivoted a locking member 48 on a bolt 49 extending through wings 51 of the locking member and through the arms or boss 47. A locking pin 52 is disposed through the lower ends of the wings 51 and in position to engage in either of the two recesses 53 provided in the edge of the wing. The locking member is held against the edge of the wing 42 by a spring 54 pressing at one side against the body of the locking member 47 and at the other against a cross member 55 in the yoke.

The yoke comprises the arms 43 and the cross member, already mentioned, and two outwardly and downwardly curving legs 56 adapted to be disposed upon opposite sides of the head of the patient. Each of these legs is provided at its bottom with a disk 57 and has pivoted to it at 58 an end of a tube carrier yoke 59 adapted to arrange an X-ray tube 61 to direct the produced rays in toward the head of the patient when arranged between the yoke arms 56.

Referring to Fig. 4 it will be noted that the carrier yoke extends straight outwardly at each side throughout the end parts 59 then inwardly at 62 and then out again in closer parallelism at 63 and therebeyond extends down at 64 to a central grip portion 65 which is located, as will be noted from Fig. 1, below the tube.

The disks 57 are provided with ratchet teeth 66 which are engageable by the ends of rods 67 mounted in bearings 68 on the parts or ends 52 of the tube carrier and connected by links 69 with a yoke lever 71 pivoted at 72 in the parts 64 of the carrier and having a grip part 73 cooperating with the grip part 65 to form a compressible end grip, a spring 74 being provided to hold the grip parts apart and the pawls or rods 67 in engagement with the ratchet. It will be manifest that by gripping the parts 65 and 73 the pawls will be withdrawn and the tube carrier may be swung up or down as occasion may require. In order that it may be arranged in predetermined position I provide indicating lines 75 on the rear side of the disks and extend the ends 59 of the tube carrier beyond the disk and bend them over into indicating points 76 so that any given position of the yoke carrier may be determined by the relation between the points 76 and the indicating lines 75 and recorded for subsequent arrangement of the tube carrier, if desired.

It will be manifest that the yoke tube carrier and tube may be swung bodily about the pivot 41 and viewing Fig. 1 it will be noted that this pivot is so located that the axis of swinging movement of the yoke tube carrier and tube passes vertically through the position assumed by the mouth of the patient when sitting on the seat 25. The yoke is arrangeable so that the horizontal axis through the pivots 58 pass also through the mouth of the patient as shown in dotted lines in Fig. 1. Any movement of the tube about its two axes 41 and 58 when the axes are thus arranged is on the surface of a sphere, the radius of which is constant and about a center located within the mouth of the patient, i. e. at the intersection of the two axes mentioned.

The rod 36 is movable vertically through the post 35 to bring the tube carrier yoke and support to desired height and means are provided to lock the rod 36 in desired position. This locking means comprises a hand screw 77 having a shank 78 in threaded engagement with the tube or post 35. Through this hand screw extends a plunger 79 curved at its inner end to engage the surface of the post 36 and provided with a key part 81 slidably engaging in a key-way 82 in the side of the post 36. A spring 83 is provided to insure the engagement between the key and keyway. The outer end of the plunger rod extends without the hand screw and is provided with a hand knob 84. The hand screw and plunger have interengaging shoulders for pressing the plunger against the post 36 to hold the parts in desired arrangement. The purpose of the key and key-way is to maintain the post accurately in operative position, i. e. extending straight out over the seat 25. When it is desired to move the entire tube carrying structure out of the way and to close up the seat, the hand screw is turned out a considerable distance and the plunger pulled back to retract the key from the key-way, whereupon the post may be turned about its own axis as will be readily understood. A set screw 85 arranged in a slot 86 in the bearing post 35 is provided to prevent the plunger turning when the key is out of engagement with the key-way.

It is believed that the X-ray tube will not need particular description except that it might be mentioned that the desired circuits are provided through wires 87 and 88 wound on spring reels 89 and 91.

A head rest, comprising two cushions 92, is provided. These cushions are carried on the end of a yoke 93 mounted upon a rod 94 having sliding engagement through a holder 95, on the part 37.

Indicating means are also preferably provided to determine the position of the tube within its horizontal range of adjustment in any particular instance and these means comprise an arcuate indicator dial 96 extending out from the upper end of the arm 37, and a pointer 97 extending up from the wing 42, already described. By taking readings on the indicator just described and also on the indicator formed at the disks 57 a record may be made of the exact arrangement of the apparatus in the taking of any particular photograph and should comparative results be later desired or for other reasons photographs required from the same location the apparatus is easily arrangeable into this accurate or predetermined or desired position.

Means are preferably provided to counterbalance the weight of the vertically movable parts on the post or rod 36 and the post itself, and these means include a collar 98 fixed on the rod within the housing and connected to a cord or cable 99 taking over pulleys or sheaves 101 and 102 within the housing and supporting a weight 103 movable in a guideway 104.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an X-ray apparatus, the combination of a cabinet for containing high potential current producing means, a seat secured to said cabinet, a tube support mounted on said cabinet and carrying an adjustable head rest, said head rest being adjustable relative to said seat, and said tube support being adjustable relative to said head rest.

2. In an X-ray apparatus, the combination of a cabinet for containing high potential current producing means, a seat forming a part of said cabinet and foldable thereinto when not in use, a tube support mounted on said cabinet and having a vertical axis normally intersecting a predetermined point on said seat, and a head support attachable to said tube support, said head support being adjustable relative to said seat, and said tube support being universally adjustable relative to said head support.

3. In an X-ray dental apparatus, the combination of a cabinet, a seat extending laterally from said cabinet, a tube, a tube support pivoted on a vertical axis above said seat and attached to said cabinet, and a head rest attachable to said tube support, said head rest being adjustable toward and away from said seat, and said tube being adapted to pivot about a horizontal axis in said tube support and universally adjustable relative to said head rest.

4. In an X-ray dental apparatus, the combination of a cabinet, a seat extending laterally from said cabinet and secured thereto, a head rest supported by said cabinet, a tube, and a tube support attachable to said cabinet and having a vertical axis above the head rest, said tube being pivoted in said tube support on a horizontal axis and universally adjustable relative to said seat and said head rest.

5. In an X-ray dental apparatus, the combination of a cabinet, a seat extending laterally from said cabinet and secured thereto, a tube, a tube support secured to said cabinet, and a head rest adjustably secured to said tube support, said tube support comprising a plurality of parts pivoted together on horizontal and vertical axes to facilitate adjustment of said tube relative to said seat and said head rest.

6. In an X-ray dental apparatus, the combination of a cabinet, a seat extending laterally from said cabinet and secured thereto, a tube, a tube support secured to said cabinet, a head rest adjustably secured to said tube support, said tube support comprising a plurality of parts pivoted together on horizontal and vertical axes to facilitate adjustment of said tube relative to said seat and said head rest, and means on said tube support for indicating tube positions.

7. In an X-ray dental apparatus, the combination of a cabinet, a curved arm extending up and out therefrom, a yoke pivoted in said arm for universal movement and arrangeable with the ends of the yoke on the side of the head of the patient, and a tube carrier pivoted in said yoke.

8. In an X-ray dental apparatus, the combination of a cabinet, a tube supporting means extending up, over and down at the front of the cabinet and having supported ends adapted to be disposed on the sides of the head of a patient, and a tube carrier having ends pivoted to said first mentioned ends.

9. In an X-ray dental apparatus, the combination of a cabinet, a tube supporting means extending up, over and down at the front of the cabinet and having supported ends adapted to be disposed on the sides of the head of a patient, a tube carrier having ends pivoted to said first mentioned ends, and a pawl and ratchet connection between the pivoted members.

10. In an X-ray dental apparatus, the combination of a cabinet, a tube supporting means extending up, over and down at the front of the cabinet and having supported ends adapted to be disposed on the sides of the head of a patient, a tube carrier having ends pivoted to said first mentioned ends, and relatively movable indicating devices for indicating the position of the tube.

HOWARD H. OSBORN.